March 12, 1935. E. V. WILBERN 1,993,815
BED ATTACHMENT FOR AUTOMOBILES
Filed Dec. 11, 1933  2 Sheets-Sheet 1
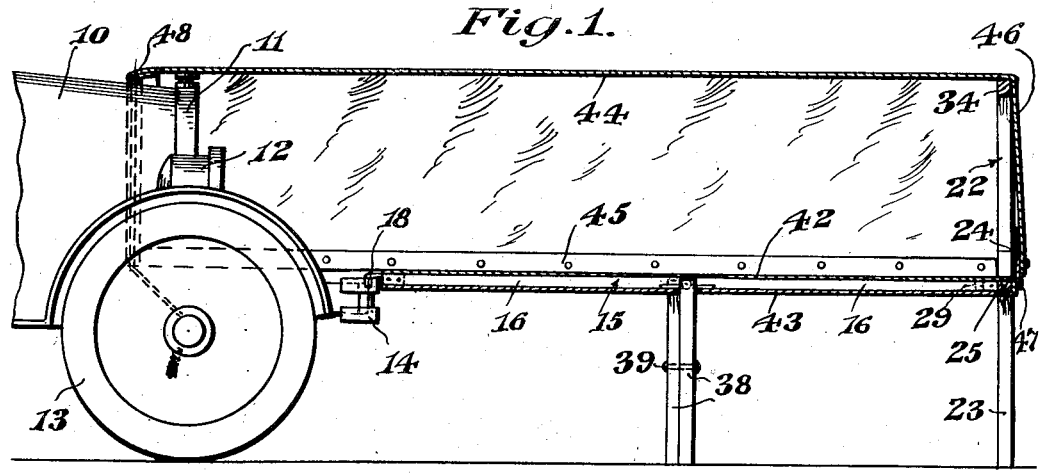
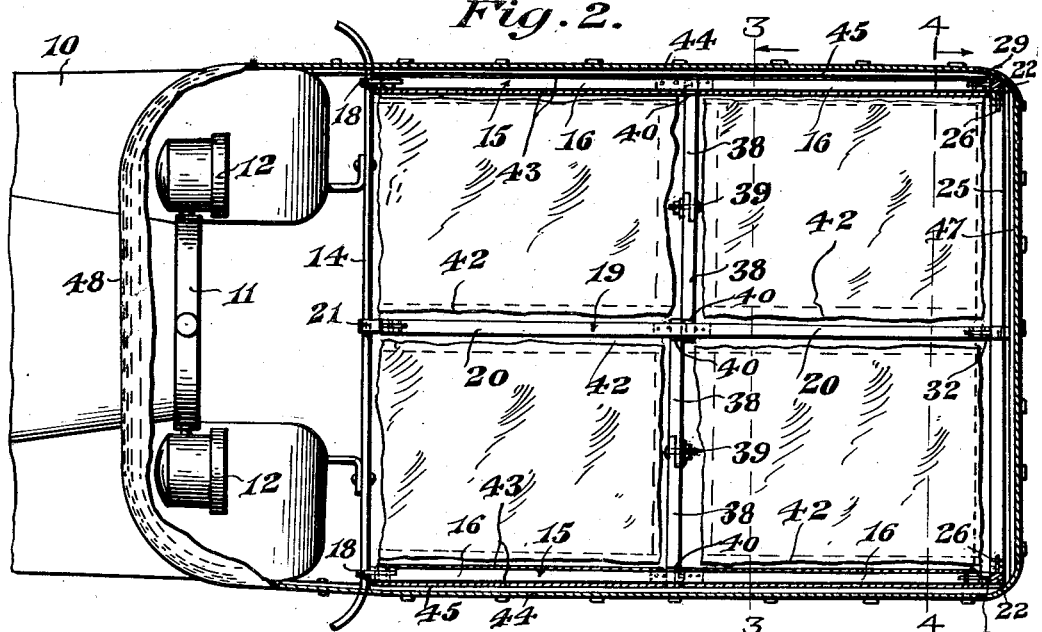
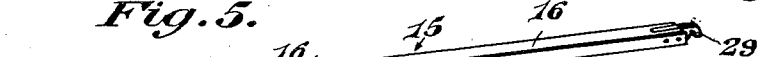
Inventor
Edward V. Wilbern,
by
Attorney March 12, 1935. E. V. WILBERN 1,993,815
BED ATTACHMENT FOR AUTOMOBILES
Filed Dec. 11, 1933 2 Sheets-Sheet 2
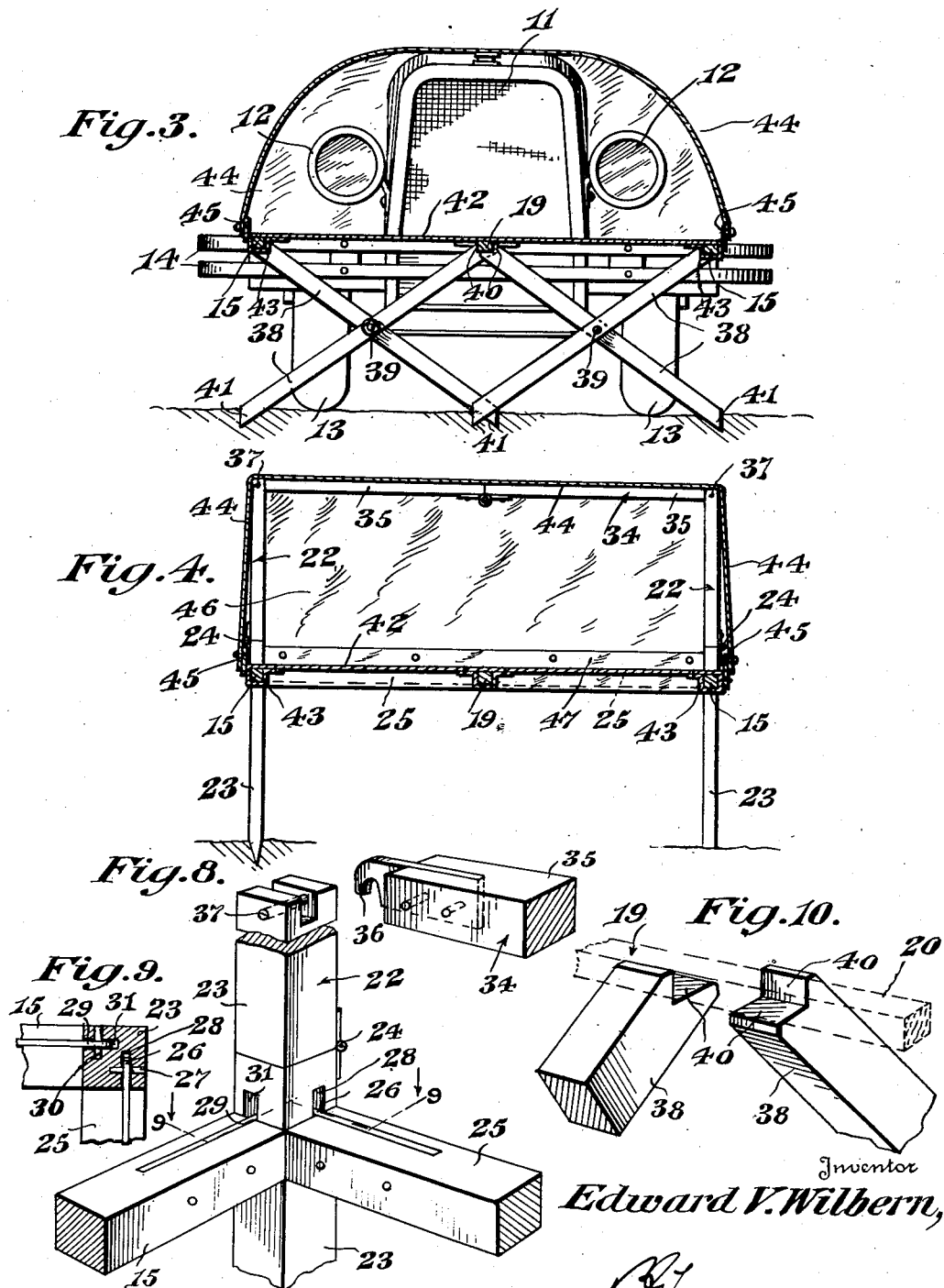
Inventor
Edward V. Wilbern,
By
Attorney Patented Mar. 12, 1935

1,993,815

UNITED STATES PATENT OFFICE 1,993,815

BED ATTACHMENT FOR AUTOMOBILES

Edward V. Wilbern, Saugerties-on-Hudson, N. Y.

Application December 11, 1933, Serial No. 701,905

9 Claims. (Cl. 5—119)

One of the objects of the present invention is to provide a structure that utilizes the automobile as a part of the support, and which may be lighted by the automobile lamps and heated by the radiator of the automobile, the structure being capable of use as a table, a bed and a tent.

A further object is to provide a structure of this character that is foldable into small compass so that it will occupy but little space in transportation and can be set up with ease and expedition.

In the accompanying drawings:

Figure 1 is a longitudinal sectional view of the structure in its set-up or operative condition.

Figure 2 is a horizontal sectional view.

Figures 3 and 4 are cross sectional views respectively on the lines 3—3 and 4—4 of Figure 2.

Figure 5 is a detail perspective view of one of the side bars.

Figure 6 is a corresponding view of the center or intermediate bar.

Figure 7 is a detail perspective view of the lower cross rail of the end frame.

Figure 8 is a perspective view showing the manner in which the side bars and cross rails may be connected to the end posts.

Figure 9 is a section on the line 9—9 of Figure 8.

Figure 10 is a detail perspective view indicating the manner in which the intermediate supports may engage the intermediate bar.

The structure as disclosed is shown as mounted on the front end of an automobile, the hood of such automobile being designated 10, the radiator 11, the lamps 12, the wheels 13, and the front bumper 14.

A bed frame is supported at one end on the bumper 14. This bed frame consists of side bars 15 composed of sections 16 hinged together, as illustrated at 17. The side bars are provided at one end with hooks 18 adapted to engage over the end portions of the front bumper 14, so that said side bars will extend forwardly from the automobile and longitudinally thereof. Between these side bars is an intermediate bar 19 also consisting of hingedly connected sections 20, and provided at one end with a hook 21 adapted to engage over the central portion of the front bumper 14.

An outer end frame is provided and is of knockdown character. It consists of corner posts 22, each comprising sections 23 hinged together, as shown at 24. A lower end rail 25 extends between the corner posts and has terminal hooks 26 that detachably engage over pins 27 placed in sockets 28 that are formed in the corner posts. The side rails 15 have hooks 29 at their outer ends that engage over pins 30 in sockets 31, also formed in the side posts. The outer end of the intermediate bar 20 has a hook 32 that engages over the central portion of the lower cross rail 25. This cross rail, as shown in Figure 7, also consists of hingedly connected sections 33. The upper ends of the posts are connected by a top rail 34 comprising hingedly connected sections 35 and having terminal hooks 36 that detachably engage over pins 37 carried by the upper ends of the posts.

In order to support the intermediate portions of the side rails 15 and intermediate rail 19, folding supports are employed, preferably in the form of crossed legs 38 pivoted together, as shown at 39, the lower ends of these legs resting on the ground, the upper ends having seats 40 or other suitable arrangements for engaging the longitudinal bars adjacent their hinged joints. Two of these are employed, as shown in Figure 3. The lower ends of the cross bars may be pointed, as shown at 41, forming spurs that will engage in the ground.

Mounted on the frame bars 16, 19 and the lower cross rail 25 is a bed bottom, preferably a suitable fabric 42 which covers the entire space within the frame (it being shown broken away in Figure 2 in order to illustrate the relation of the frame bars). This fabric sheet 42 has its side margins wrapped around the side bars 15 as shown at 43 in Figure 4. The fabric sheet not only constitutes a bed bottom, but may be employed as a table top, around which persons may gather, and at night it can be illuminated by the light from the automobile lamps 12.

When used as a bed it is preferably enclosed, and for this purpose a canopy 44 of fabric is provided, the sides of which may be lashed to the bed bottom, said bottom being provided along its opposite edges with suitable strips 45 for the purpose. This canopy has an end portion 46 that may be let down and correspondingly lashed or otherwise secured to a strip 47 along the end of the bed bottom fabric 42. The other end of the canopy is provided with a suitable cord or cable 48 and this end is adapted to lie over and embrace the hood 10 in rear of the radiator 11, the cord being suitably lashed to any convenient part of the automobile, as the axle, thus making a tight covering, and as clearly illustrated in Figures 1 and 3, placing the radiator 11 and the lamps 12 within the tent-like enclosure. Thus the heat from the radiator may be made to effect the heating of the interior of the canopy and the interior may also be illuminated if desired.

It will be evident that this structure is a simple one which can be easily mounted on the front end of an automobile, and the automobile will constitute a part of the support therefor. The lamps may be used for illuminating the interior and the interior may also be heated, thus making a comfortable enclosure for retirement and sleep. Without the canopy a table is provided. The structure can be quickly folded or set up and when dismantled it will occupy but little space so that it is easily transported either within the body of an automobile or as an external part of the baggage thereof.

From the foregoing, it is though that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. A bed or like structure for automobiles including a frame comprising side bars and an intermediate bar, said bars consisting of hingedly connected sections, hooks on the bars at one end of the frame for engagement over the bumper of an automobile, an end frame including corner posts, a cross bar detachably connecting the posts, means detachably connecting the intermediate bar and the cross bar, and means detachably connecting the side bars to the posts.

2. A bed or like structure for automobiles including a frame comprising side bars and an intermediate bar, said bars consisting of hingedly connected sections, hooks on the bars at one end of the frame for engagement over the bumper of an automobile, an end frame including corner posts, a cross bar detachably connecting the posts, means detachably connecting the intermediate bar and the cross bar, means detachably connecting the side bars to the posts, and means for supporting the intermediate bar and the side bars between their ends.

3. A bed or like structure for automobiles including a frame comprising side bars and an intermediate bar, said bars consisting of hingedly connected sections, hooks on the bars at one end of the frame for engagement over the bumper of an automobile, an end frame including corner posts, a cross bar detachably connecting the posts, means detachably connecting the intermediate bar and the cross bar, means detachably connecting the side bars to the posts, and pivotally connected crossed supporting legs engaged with the intermediate and side bars adjacent to their hinges.

4. In a bed or like structure for automobiles, the combination with a tent-like enclosure, of means for mounting one end of the same on an automobile hood and enclosing the radiator thereof within the same, said radiator thereby constituting a heater for the interior of the enclosure, and means for supporting the other end of the enclosure.

5. In a bed or like structure for automobiles, the combination with a tent-like enclosure, of means for mounting one end of the same on an automobile hood and enclosing the radiator and lamps thereof within the same, said radiator thereby constituting a heater and the lamps constituting illuminating means for the interior of the enclosure, and means for supporting the other end of the enclosure.

6. The combination with a foldable frame, of means carried by the frame for detachably engaging the front bumper of an automobile to support the frame at one end thereof, means for supporting the other end in advance of the automobile, a bed bottom supported by the frame, a canopy that extends over the bed bottom, means for mounting one end of the canopy on the automobile over the hood thereof and enclosing the radiator and lamps within the same to cause the same to respectively constitute heating and illuminating means for the interior of the canopy, and means for supporting the canopy above the bed bottom.

7. The combination with a body frame comprising foldable side bars and a foldable intermediate bar, hooks on the bars at one end for engagement over the front bumper of an automobile, a foldable end frame with which the other ends of the bars are detachably engaged, said end frame extending above the side bars, a bed bottom fabric sheet supported by the intermediate and side bars, a canopy that extends over the body frame and bed bottom, means for securing one end of the canopy over the automobile hood to enclose the radiator and lamps, and means for securing the other end of the canopy to the end frame.

8. In combination with an automobile having a radiator and head lamps, a tent-like enclosure having an end portion that encloses the radiator and head lamps, said enclosure having its main portion extending in advance of the automobile, means for detachably securing the said end portion of the enclosure upon the automobile, and means for supporting the main portion of the canopy in advance of the automobile.

9. In combination with an automobile having a radiator, a front bumper and head lamps, a bed having one end mounted on the bumper, means for supporting the other end of the bed above the ground in advance of the bumper, a tent-like enclosure having an end portion that encloses the radiator and head lamps, said enclosure having its main portion extending in advance of the automobile and covering the bed, means for detachably securing the said end portion of the enclosure upon the automobile, and means carried by the bed for supporting the main portion of the canopy in advance of the automobile.

EDWARD V. WILBERN.